United States Patent [19]
Guibert

[11] 3,847,069
[45] Nov. 12, 1974

[54] PIZZA BAKING OVEN WITH A HELICAL RACK AND A RADIALLY DRIVEN IMPELLER

[75] Inventor: Raul Guibert, New York, N.Y.

[73] Assignee: Jeno F. Paulucci, Duluth, Minn.

[22] Filed: Dec. 19, 1972

[21] Appl. No.: 426,065

[30]   Foreign Application Priority Data
Dec. 20, 1972   Argentina .......................... 245751
Dec. 20, 1972   Argentina .......................... 245752

[52] U.S. Cl. .................... 99/443 R, 99/365, 13/21, 219/388
[51] Int. Cl. ............................................ A47j 37/06
[58] Field of Search .......... 219/388, 389, 400, 405, 219/411; 13/21; 34/203; 221/21; 99/360, 99/362, 365, 235 R, 443 R, 443 C, 448

[56]           References Cited
            UNITED STATES PATENTS
1,275,203   8/1918   Beckett ............................. 99/365
2,438,699   3/1948   Groetchen ....................... 99/448 X
2,651,435   9/1953   Stahmer ............................. 221/21
3,528,363   9/1970   Creed ................................. 99/365
3,552,299   1/1971   Patoka ........................... 99/448 X
3,601,037   8/1971   Giaretta .......................... 99/443 C Primary Examiner—Volodymyr Y. Mayewsky
Attorney, Agent, or Firm—Hill, Gross, Simpson, Van Santen, Steadman, Chiara & Simpson

[57]          ABSTRACT

An oven is provided with a support rack in spiral form with an access door thereto at the lower end of the rack, and at least one additional access door for loading articles on the rack. A baking heater is disposed in proximity to the turns of the helical rack while a driven impeller moves in a path spaced radially outwardly from the rack to engage articles which overhang the edge of the track. According to another aspect of the invention, the food products heated by this oven are carried on a round tray that has an open bottom to enable the food article to be baked on both sides at one time. The coaction between the impeller and the support rack causes the tray to rotate about its own axis as it moves along the helical track.

12 Claims, 7 Drawing Figures

PIZZA BAKING OVEN WITH A HELICAL RACK AND A RADIALLY DRIVEN IMPELLER

BACKGROUND OF THE INVENTION

1. Field of the Invention

This invention relates generally to electrically heated ovens, and more specifically to an oven that is provided with means for rotating the article being heated about a generally vertical axis.

2. Prior Art

Hot food articles, such as pizzas, are frequently prepared at the place of consumption, and the article may be sized to constitute a single serving. It has been found that in attempting to bake such articles rapidly, there is a tendency for the baking to be uneven. This problem is heightened by the fact that the same equipment will typically be used for baking a pizza that begins in the frozen state as well as one that begins in the unfrozen state, and of course, the degree of freezing can vary from point to point on a particular pizza, thereby causing uneven rising, uneven baking and uneven browning, and in some instances even causing burning before the article is ready for consumption. There can be superficial overcooking with inadequate rising of dough. To resolve such problem, in the past, a separate oven has been utilized to thaw the dough before baking, and such an arrangement becomes burdensome in that the operator needs to use two ovens, needs to have multiple opening and closing of doors, and is placed at a disadvantage in needing to estimate baking time.

SUMMARY OF THE INVENTION

According to this invention, an oven is provided with a helical member for supporting articles to be baked, the support member including a helical track which not only slopes downwardly in the direction of its extent, but also slopes downwardly in a radial inward direction so that the article supported thereby can engage a central cylindrical surface. The article overhangs the track and a driven impeller operating in a path that circumscribes the support rack engages the overhanging part of the article. The interaction between the impeller, the track, the cylindrical surface and the article causes the article to rotate about its own axis as it moves down the helical path, thereby providing uniformity of baking. Further, according to another aspect of the invention, the track is extended upwardly into a preheating zone so that when the article is thawed out, it is automatically transferred to the baking zone to be baked as described.

Accordingly, it is an object of the present invention to provide an oven which is in fact a new culinary system for heating foods.

A further object of the invention is to provide an oven which will cause the foods or articles to be rotated during baking so as to obtain even baking and browning thereof.

A still further object of the present invention is to provide an oven of the type described which includes a preheating zone contiguous to a baking zone whereby either frozen or thawed articles may be processed with the oven otherwise unchanged.

Many other advantages, features and additional objects of the present invention will become manifest to those versed in the art upon making reference to the detailed description and the accompanying drawings in which preferred structural embodiments incorporating the principles of the present invention are shown by way of illustrative example.

ON THE DRAWINGS

AS SHOWN ON THE DRAWINGS

Figure 1:
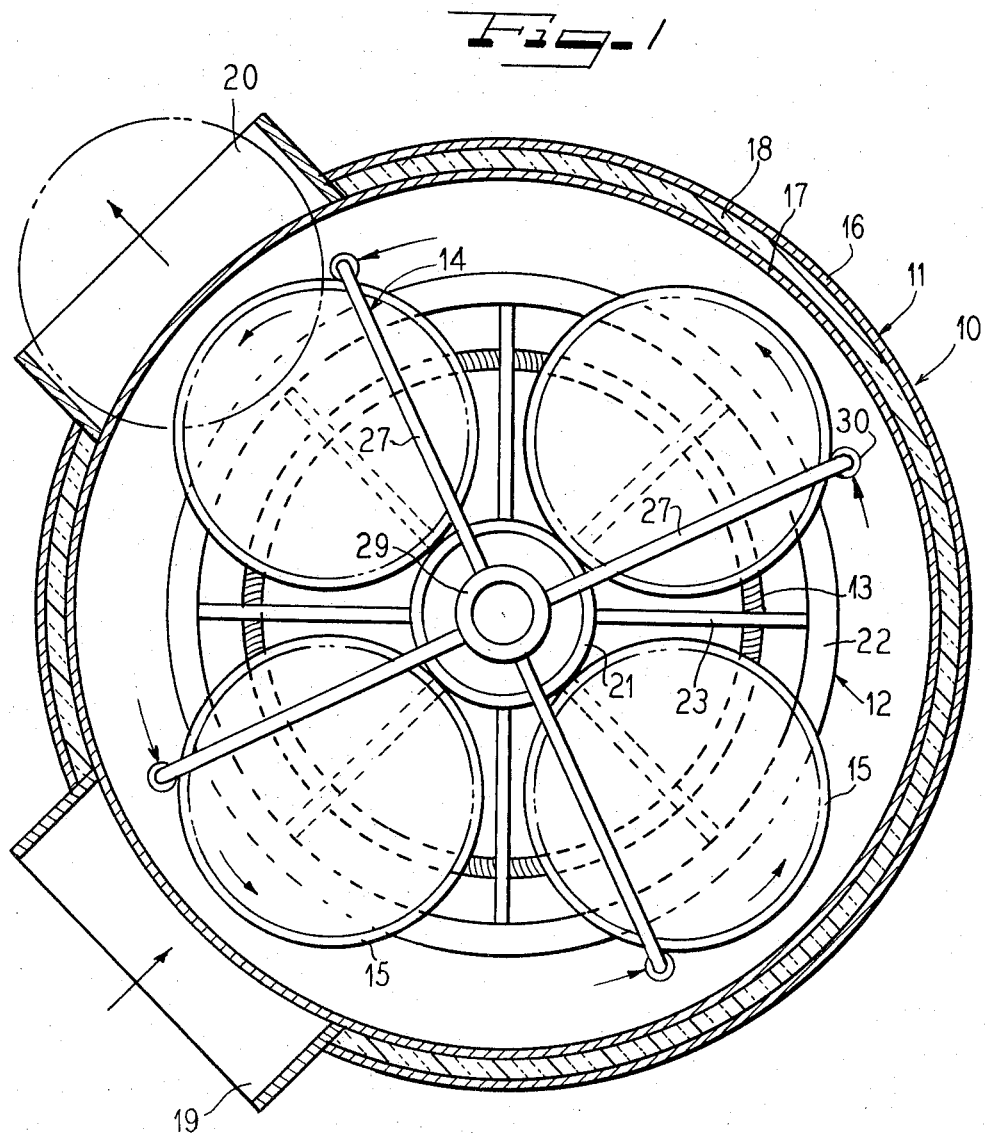
FIG. 1 is a horizontal cross sectional view of a baking oven provided in accordance with the principles of the present invention, the drawing being to some extent schematic.
Figure 2:
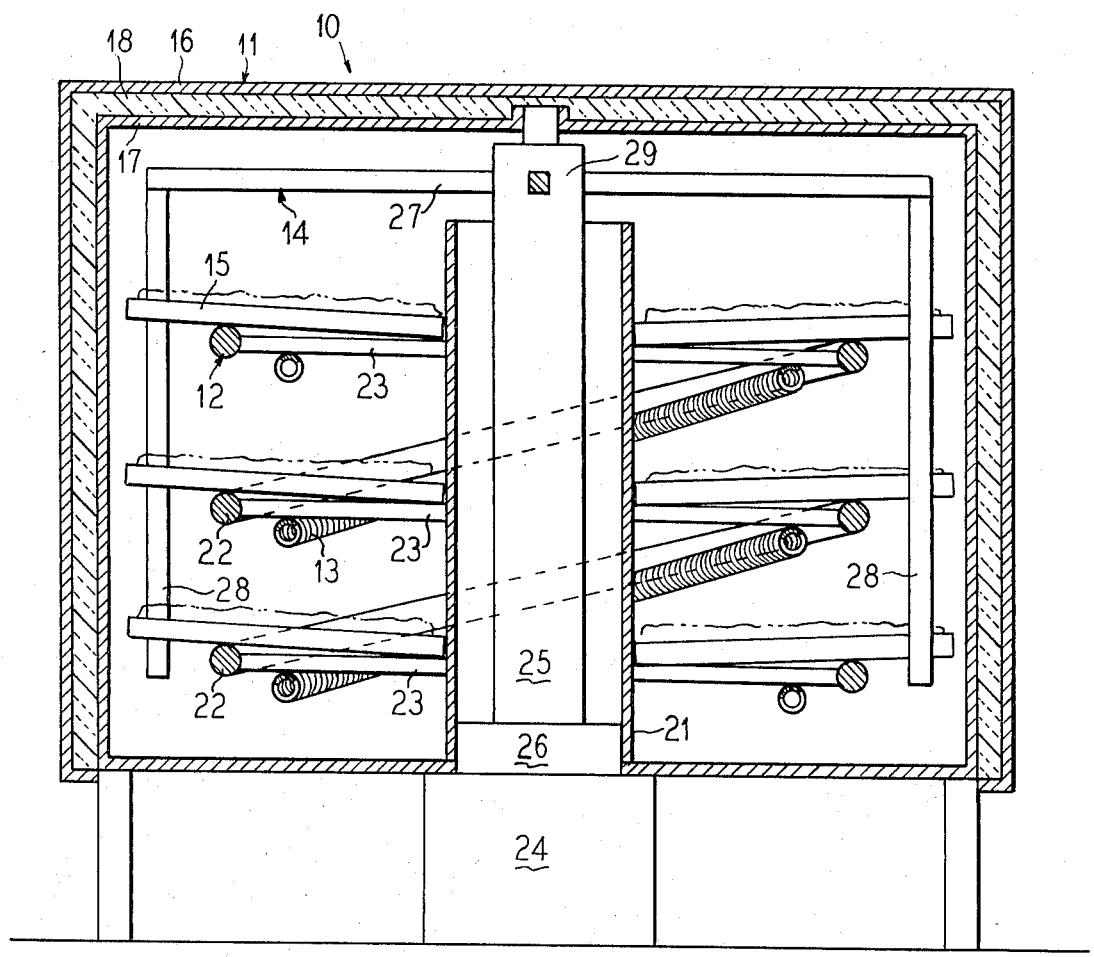
FIG. 2 is a cross-sectional view taken vertically through FIG. 1.

The principles of the present invention are particularly useful when embodied in an oven such as shown in FIGS. 1 and 2, generally indicated by the numeral 10. The oven includes a cabinet 11, a support rack 12, a baking heater 13, and a driven impeller 14 which serves to move a number of round trays 15 along the support rack 12.

The cabinet 11 has an outer jacket 16, a liner jacket 17 and a quantity of insulation 18 separating the jackets 16, 17. The cabinet 11 is provided with an access or entry door 19 and an exit door 20, movable details of which are omitted due to the diagrammatic nature of the illustration.

The support rack 12, best seen in FIG. 2, includes a hollow cylinder 21, the outer surface of which comprises a cylindrical formation. Also included is a helical rail 22 which has individual turns that extend about the vertical axis. A number of spokes 23 are fixedly joined to the helical rail 22 at their outer ends, and at their inner ends are secured, as by welding, to the cylinder 21. The rail 22 with the supporting spokes 23 comprise a track which is substantially open in a vertical direction as best seen in FIG. 1. The upper surface of the track or rail portion 22 thereof is higher than the upper surface of the radially inner end of the spokes 23 so that the track slopes downwardly not only in the direction of the helix, but also in a radial direction so that the tray 15 resting thereof is biased by gravity to move toward the outer surface of the cylinder 21.

The baking heater 13 is disposed in proximity to the turns of the track 22 and in particular, between the turns thereof and closer to the turn above it than to the turn below it so as to provide clearance for the articles being baked. The baking heater 13 gives off radiant energy both to the upper surface of the article below it and to the lower surface of the article immediately above it.

The driven impeller 14 includes a motor 24 which slowly drives a shaft 25 by acting through a reducing gear 26. At the upper end, the shaft is guided by the cabinet and the shaft 25 supports a number of radial extensions 27, to the outer end of which there is connected and there depends an impeller leg 28 in the form of a vertical bar. The upper end of the shaft 25 can be considered as being a hub 29 that supports the impeller bars or legs 28. The individual trays 15 carried by the support track 12 project radially in overhanging relation beyond the helical track 22. The individual impeller legs or bars 28 move in a cylindrical or orbital path around the outside of the support rack 12, and the overhanging portion of the trays or articles 15 projects horizontally into the path of the impeller 14.

In operation, a tray 15, carrying a food item to be baked, (shown in chain lines) is inserted through the upper door 19 onto the support rack 12. Such insertion is done between a pair of the legs 28. The next succeeding leg 28 rotates into engagement with the trailing edge of the tray 15 and nudges it along down the helical track, along the length of the baking heater 13, to the exit or outlet door 20.

One of the most significant aspects of the present invention is that the geometrical configuration described further causes the tray 15 to rotate about its own axis, and such direction of rotation can be made to take place in either direction. When the friction is relatively high between the outer perimeter of the tray 15 and the cylindrical surface of the cylinder 21 engaged thereby, then there is a tendency for the tray perimeter to roll on the outside diameter of the cylinder 21. With the impeller 14 rotating in a counterclockwise direction as shown by the arrows, the trays 15 also tend to rotate at a rather slow rate in the direction of the individual arrows carried thereon, making approximately one revolution during the number of turns illustrated for the helix. Such turning is facilitated by a number of rollers 30, shown in FIG. 1 but omitted from FIG. 2, carried by the impeller leg 28 and disposed to minimize friction between the impeller leg and the tray 15.

For this direction of rotation of the impeller 14, the trays 15 have also been observed as rotating in a direction opposite to that described. When this takes place, the point of contact on the tray 15 which engages the cylindrical surface 21 advances faster than the movement past the surface 21 to provide a slight skidding effect. This result is readily obtainable when the friction between the rail 22 and the tray 15 is relatively high. However, it has been found in practice that either direction of tray rotation about is own axis is desirable. Thus, a point on the tray moves in an epicycloidal path. If desired, the outer surface of the cylinder 21 can be modified to increase its frictional relationship to the trays 15 to insure a particular direction of rotation. Preferably, the motor 24 is of the variable speed type so that the desired baking time can be obtained to coincide with the time that it takes for one tray to move down the helical rack. The slope of the helical track 22 in a radially inward downward direction increases the positive frictional engagement between the tray and the cylinder 21, thereby insuring uniform baking and browning.

Figure 3:
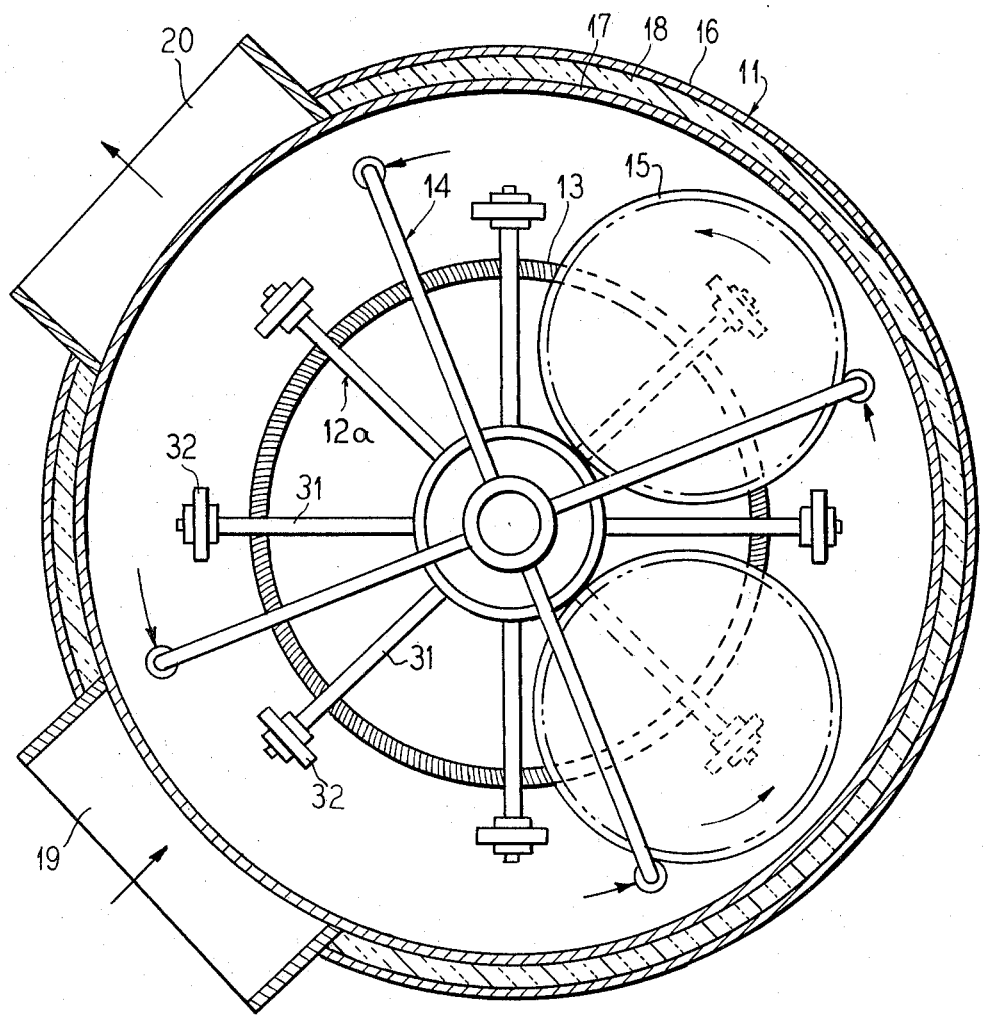
FIG. 3 is a horizontal cross sectional view of an oven having a modified form of support rack structure.

Even though the trays 15 can be handled separately, they constitute a novel part of the mechanism of the present oven without which, the oven could not be used. In practice, a relatively large number of trays would be available for use with a particular oven, A modified form of the present invention is illustrated in FIG. 3. In this embodiment, the support rack 12a also comprises radial spokes 31, but in place of the rail, the outer end of each spoke 31 supports a roller 32, which is otherwise similar to the support rack 12 of FIGS. 1 and 2.

Figure 4:
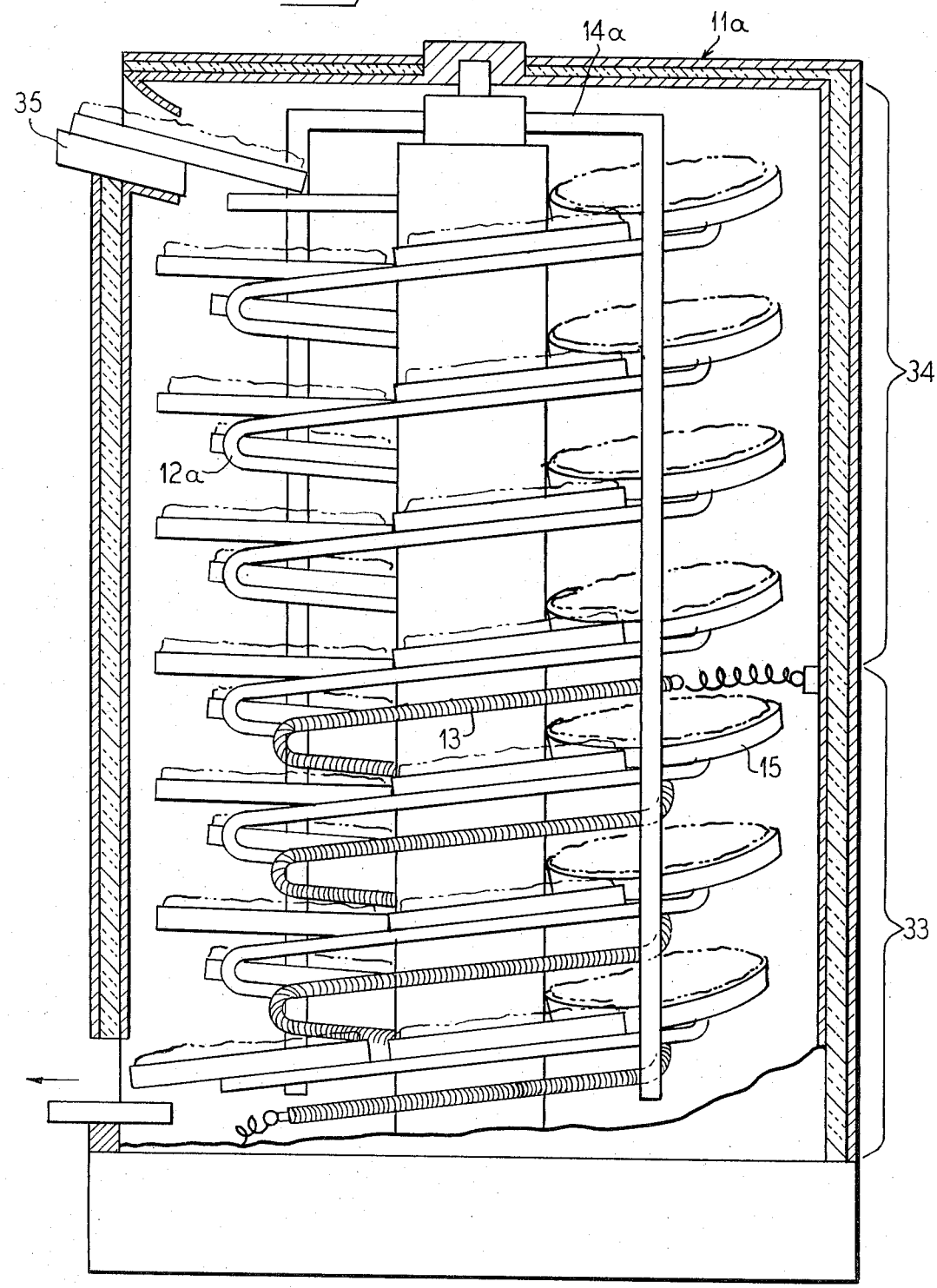
FIG. 4 is a vertical cross sectional view of a modified oven having a preheating zone or chamber.

As shown in FIG. 4, the structure may be elongated vertically, so that in addition to a baking zone 33, corresponding to that of FIG. 2, there is also provided a preheating zone or region 34 having an additional entrance 35. The baking heater 13 does not extend into the preheating zone 34 and thus radiant energy emanating directly therefrom is as a practical matter not present. However, the baking heater 13 does heat the air which flows by convection to the upper portion of the elongated cabinet 11a to provide a hot air zone in which food articles, stored under freezing conditions, may be brought to substantially the same temperature as those articles which otherwise would enter the oven substantially at the upper end of the baking heater 13, as previously described. In this embodiment, the cabinet 11a is elongated as is the support rack 12a and the impeller 14a. In the first section 34, the dough is warmed, while in the second section 33, the article is baked. The lower section 33 is the only one that has direct heat because the route of its track follows the infra-red baking heater 13.

Figure 5:
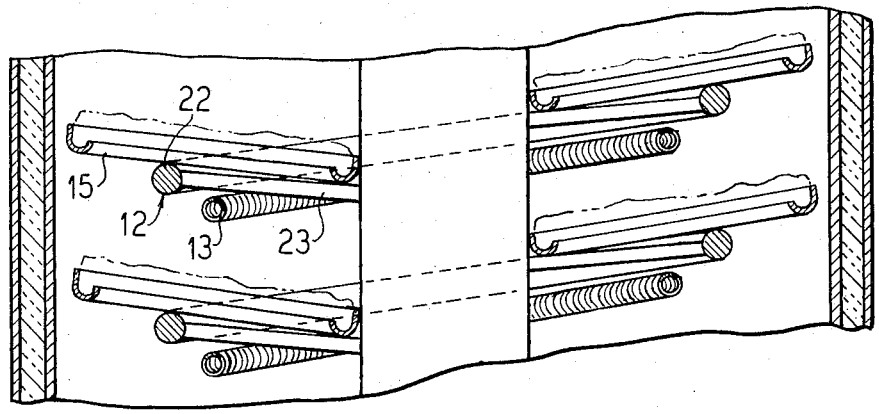
FIG. 5 is a fragmentary view of a portion of FIGS. 2 and 4, the impeller being omitted from the illustration.
Figure 6:
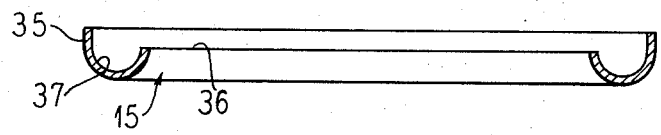
FIGS. 6 and 7 are respectively cross sectional and plan views of a special tray representative of the type of tray which typically is needed for use of any of the forms of the oven shown herein.
Figure 7:
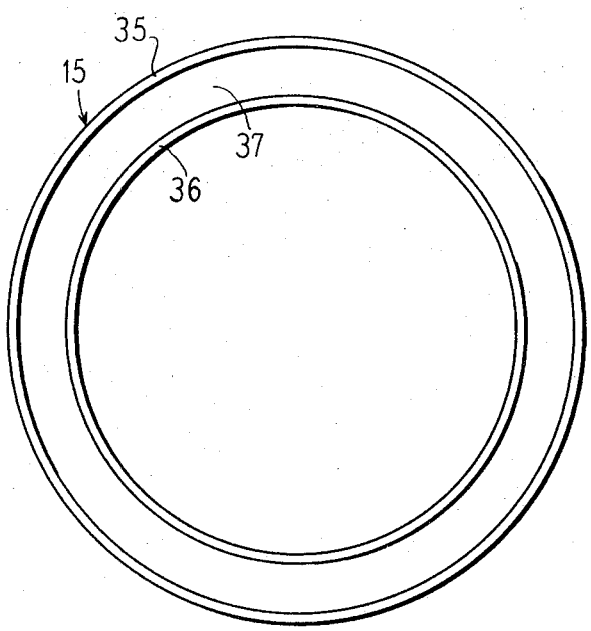

As shown in FIGS. 6 and 7, the trays 15 are of annular construction in that they are substantially bottomless. The outer periphery 35 has a greater axial extent than the inner periphery 36 so that the food article will be retained therein. Between the outer and inner peripheries 35, 36, the tray 15 has a gutter 37 which traps juices that may run off the edge of a food article supported on the inner peripheral lip 36. The coaction of this tray 15 with the heating element is shown in FIG. 5, which makes it evident how radiant energy from the heater can pass downwardly directly onto the upper surface of the food article and can pass also upwardly through what is a substantially fully open support rack to also engage or impinge against the lower side of the food article exposed by the central opening in the substantially bottomless tray. Movement of the tray down the helical path removes any masking effect which individual spokes 23 might create, and rotation of the tray 15 about its own axis removes any making effect that the rail 22 of the helical rack might otherwise provide.

Although various minor modifications might be suggested by those versed in the art, it should be understood that I wish to embody within the scope of the patent warranted hereon, all such embodiments as reasonably and properly come within the scope of my contribution to the art.

I claim as my invention:

1. An oven comprising:
   a. a cabinet having a baking chamber;
   b. a support rack including means defining a helical track for supporting a circular article to be baked, in a radially outwardly overhanging relation thereon, said helical track having a vertical axis;
   c. a electrical baking heater disposed in proximity to said rack; and
   d. a driven impeller movable about said vertical axis in a path which is radially external to said rack but which intersects the overhanging portion of the circular articles, the coaction between said support rack and said impeller on the article causing the article to pass along the helical track about said vertical axis, while simultaneously rotating about its own axis, whereby uniform baking of the article is obtained.

2. An oven according to claim 1 in which said support rack includes a surface lying in a cylindrical formation at the radially inner edge of said track toward which said track is sloped radially downwardly for being engaged by the perimeter of the circular article.

3. An oven according to claim 1 in which said track is largely open in a vertical direction, said heater lying between successive turns of said track.

4. An oven according to claim 1 in which said cabinet has a pair of vertically spaced access doors, one disposed adjacent to the lower end of said track, and the other disposed somewhat higher.

5. An oven according to claim 2 in which said cylindrical formation is the outer surface of a stationary cylinder.

6. An oven according to claim 5 in which said track is a rail having radially inwardly directed spokes secured to said cylinder.

7. An oven according to claim 5 in which said track is a series of roller disposed in a helical pattern and respectively secured by radially inwardly directed spokes to said cylinder.

8. An oven according to claim 1 in which said helical track extends vertically beyond said baking heater for at least one turn into a region of lower effective temperature for serving as a preheater.

9. An oven according to claim 1 including at least one such article comprising a round tray having a substantially fully open bottom for exposing the lower side of its contents to heat.

10. An oven according to claim 9 in which said tray is annular and has a gutter between its radial peripheries.

11. An oven according to claim 5 in which said impeller is a series of vertical bars secured to a hub concentric with said axis, said hub being secured to a rotatably driven shaft extending through said cylinder.

12. An oven according to claim 8 in which said baking heater is arranged to be energized to provide radiant energy to any article in its proximity and to heat air for convection-heating of said region of lower effective temperature.

* * * * *